United States Patent
Vajapeyam et al.

(10) Patent No.: US 10,412,690 B2
(45) Date of Patent: Sep. 10, 2019

(54) POWER HEADROOM REPORTING FOR LOW COST MACHINE TYPE COMMUNICATION

(71) Applicant: QUALCOMM Incorporated, San Diego, CA (US)

(72) Inventors: Madhavan Srinivasan Vajapeyam, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 15/199,619

(22) Filed: Jun. 30, 2016

(65) Prior Publication Data
US 2017/0013570 A1    Jan. 12, 2017

Related U.S. Application Data

(60) Provisional application No. 62/191,265, filed on Jul. 10, 2015.

(51) Int. Cl.
*H04W 52/36* (2009.01)
*H04W 72/04* (2009.01)
(Continued)

(52) U.S. Cl.
CPC ....... *H04W 52/365* (2013.01); *H04L 61/6022* (2013.01); *H04W 4/70* (2018.02); *H04W 24/08* (2013.01); *H04W 52/242* (2013.01); *H04W 72/0413* (2013.01); *H04W 74/0833* (2013.01); *H04W 52/146* (2013.01)

(58) Field of Classification Search
CPC .......................... H04W 52/365; H04W 24/08
See application file for complete search history.

(56) References Cited

U.S. PATENT DOCUMENTS

2009/0175187 A1    7/2009   Jersenius et al.
2011/0243016 A1    10/2011  Zhang et al.
(Continued)

FOREIGN PATENT DOCUMENTS

EP    2341739 A1    7/2011

OTHER PUBLICATIONS

ISA/EPO, Partial International Search Report of the International Searching Authority, Int'l. App. No. PCT/US2016/041595, dated Sep. 26, 2016, European Patent Office, Rijswijk, NL, 7 pgs.
(Continued)

*Primary Examiner* — Rhonda L Murphy
(74) *Attorney, Agent, or Firm* — Holland & Hart LLP

(57) ABSTRACT

Enhanced power headroom reporting (ePHR) for MTC devices. The ePHR techniques may include configuration and triggering of reporting when a corresponding change to a coverage enhancement (CE) level is likely to result. For example, ePHR may be based on parameters more directly related to PH change instead of PL changes. MTC devices may be configured with multiple thresholds for ePHR reporting that define ePHR regions associated with CE levels. In some examples, an ePHR triggered at the MAC level is used to trigger sending a request for uplink data resources. Legacy PH reporting may be disabled when ePHR is configured to reduce overhead.

28 Claims, 14 Drawing Sheets

(51) Int. Cl.
*H04L 29/12* (2006.01)
*H04W 74/08* (2009.01)
*H04W 24/08* (2009.01)
*H04W 52/24* (2009.01)
*H04W 4/70* (2018.01)
*H04W 52/14* (2009.01)

(56) References Cited

U.S. PATENT DOCUMENTS

| | | |
|---|---|---|
| 2012/0236735 A1 | 9/2012 | Nory et al. |
| 2014/0329551 A1 | 11/2014 | Ryoo et al. |
| 2015/0264655 A1* | 9/2015 | Lee ............... H04W 24/10 370/329 |
| 2016/0037463 A1* | 2/2016 | Siomina ........... H04W 52/365 370/330 |
| 2016/0227505 A1* | 8/2016 | Loehr ............. H04W 56/0005 |
| 2017/0034789 A1* | 2/2017 | Kim ............... H04W 52/346 |

OTHER PUBLICATIONS

ISA/EP, International Search Report and Written Opinion of the International Searching Authority, Int'l Application No. PCT/US2016/041595, dated Jan. 3, 2017, European Patent Office, Rijswijk, NL, 16 pgs.

* cited by examiner

POWER HEADROOM REPORTING FOR LOW COST MACHINE TYPE COMMUNICATION

CROSS REFERENCES

The present Application for patent claims priority to U.S. Provisional Patent Application No. 62/191,265 by Vajapeyam et al., entitled "Power Headroom Reporting for Low Cost MTC," filed Jul. 10, 2015, assigned to the assignee hereof.

BACKGROUND

Field of the Disclosure

The present disclosure, for example, relates to wireless communication systems, and more particularly to closed-loop uplink power control for machine-type communication (MTC) devices.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In some cases, a UE, such as a low-cost or low-complexity MTC device may have limitations on frequency range or link budget. Various coverage enhancement techniques may be used to enhance communications with the MTC device including repetition of downlink or uplink transmissions. Adapting power control for coverage enhancement techniques may present challenges.

SUMMARY

Methods, systems, and devices are described for enhanced power headroom reporting (ePHR) for MTC devices. The ePHR techniques may include configuration and triggering of reporting when a corresponding change to a coverage enhancement (CE) level is likely to result. For example, ePHR may be based on parameters more directly related to power headroom (PH) change instead of path loss (PL) changes. In some examples, an enhanced power headroom (ePH) is determined according to a reference format different from the PH value computed for a particular subframe associated with a data transmission. The ePH may be based on one or more of a predetermined number of uplink resources, a target modulation and coding scheme, a target signal to noise ratio, or a current coverage enhancement configuration. In some examples, legacy PH reporting may be disabled when ePHR is configured to reduce overhead.

MTC devices may be configured with multiple thresholds for ePHR reporting that define ePHR regions associated with CE levels. An ePHR may be triggered when the ePH falls within a different region as the previous ePH. In some examples, an ePHR triggered at the MAC level is used to trigger sending a request for uplink data resources. In some examples, ePHR regions may be grouped into configuration groups and an ePHR configuration may be different for different configuration groups. For example, each configuration group may have different ePHR reporting periods, different ePHR trigger thresholds. Additionally or alternatively, ePHR reporting may be disabled for a configuration group (e.g., where a configuration group is associated with a fixed CE level, etc.).

A method of wireless communication at a base station is described. The method may include receiving a power headroom report from a UE, determining a coverage enhancement level for the UE based at least in part on the received power headroom report, and sending a coverage enhancement configuration to the UE based at least in part on the determined coverage enhancement level.

An apparatus for wireless communication at a base station is described. The apparatus may include means for receiving a power headroom report from a UE, means for determining a coverage enhancement level for the UE based at least in part on the received power headroom report, and means for sending a coverage enhancement configuration to the UE based at least in part on the determined coverage enhancement level.

A further apparatus for wireless communication at a base station is described. The apparatus may include a processor, memory in electronic communication with the processor, and instructions stored in the memory and operable, when executed by the processor, to cause the apparatus to receive a power headroom report from a UE, determine a coverage enhancement level for the UE based at least in part on the received power headroom report, and send a coverage enhancement configuration to the UE based at least in part on the determined coverage enhancement level.

A non-transitory computer-readable medium storing code for wireless communication at a base station is described. The code may include instructions executable to receive a power headroom report from a UE, determine a coverage enhancement level for the UE based at least in part on the received power headroom report, and send a coverage enhancement configuration to the UE based at least in part on the determined coverage enhancement level.

In some examples of the method, apparatuses, or non-transitory computer-readable medium described herein, the coverage enhancement configuration comprises a number of transmission repetitions associated with the coverage enhancement level.

A method of wireless communication at a base station is described. The method may include sending an enhanced power headroom reporting configuration to the UE, the enhanced power headroom reporting configuration comprising one or more of a parameter for calculating enhanced power headroom, an enhanced power headroom reporting period, or one or more thresholds associated with one or more enhanced power headroom reporting regions.

An apparatus for wireless communication at a base station is described. The apparatus may include means for sending an enhanced power headroom reporting configuration to the UE, the enhanced power headroom reporting configuration comprising one or more of a parameter for calculating enhanced power headroom, an enhanced power headroom reporting period, or one or more thresholds associated with one or more enhanced power headroom reporting regions.

A further apparatus for wireless communication at a base station is described. The apparatus may include a processor, memory in electronic communication with the processor, and instructions stored in the memory and operable, when executed by the processor, to cause the apparatus to send an enhanced power headroom reporting configuration to the UE, the enhanced power headroom reporting configuration comprising one or more of a parameter for calculating enhanced power headroom, an enhanced power headroom reporting period, or one or more thresholds associated with one or more enhanced power headroom reporting regions.

A non-transitory computer-readable medium storing code for wireless communication at a base station is described. The code may include instructions executable to send an enhanced power headroom reporting configuration to the UE, the enhanced power headroom reporting configuration comprising one or more of a parameter for calculating enhanced power headroom, an enhanced power headroom reporting period, or one or more thresholds associated with one or more enhanced power headroom reporting regions.

A method of wireless communication at a UE is described. The method may include receiving, from a serving base station, an enhanced power headroom reporting configuration defining a plurality of enhanced power headroom regions, determining that a current power headroom is associated with a different one of the plurality of enhanced power headroom regions than a previous power headroom, and reporting the current power headroom to the serving base station.

An apparatus for wireless communication at a UE is described. The apparatus may include means for receiving, from a serving base station, an enhanced power headroom reporting configuration defining a plurality of enhanced power headroom regions, means for determining that a current power headroom is associated with a different one of the plurality of enhanced power headroom regions than a previous power headroom, and means for reporting the current power headroom to the serving base station.

A further apparatus for wireless communication at a UE is described. The apparatus may include a processor, memory in electronic communication with the processor, and instructions stored in the memory and operable, when executed by the processor, to cause the apparatus to receive, from a serving base station, an enhanced power headroom reporting configuration defining a plurality of enhanced power headroom regions, determine that a current power headroom is associated with a different one of the plurality of enhanced power headroom regions than a previous power headroom, and report the current power headroom to the serving base station.

A non-transitory computer-readable medium storing code for wireless communication at a UE is described. The code may include instructions executable to receive, from a serving base station, an enhanced power headroom reporting configuration defining a plurality of enhanced power headroom regions, determine that a current power headroom is associated with a different one of the plurality of enhanced power headroom regions than a previous power headroom, and report the current power headroom to the serving base station.

In some examples of the method, apparatuses, or non-transitory computer-readable medium described herein, the current power headroom comprises an enhanced power headroom determined based at least in part on one or more of a predetermined number of uplink resources, a target modulation and coding scheme, a target signal to noise ratio, or a current coverage enhancement configuration. Additionally or alternatively, in some examples the enhanced power headroom reporting configuration comprises a plurality of configuration groups, each of the plurality of configuration groups comprising one or more of the plurality of enhanced power headroom regions.

Some examples of the method, apparatuses, or non-transitory computer-readable medium described herein may include processes, features, means, or instructions for disabling an enhanced power headroom report for at least one of the plurality of configuration groups based at least in part on at least one of the plurality of enhanced power headroom reporting configurations. In some examples of the method, apparatuses, or non-transitory computer-readable medium described herein, the plurality of configuration groups may include configuration groups with at least one of a different timer, a different enhanced power headroom reporting trigger threshold, a different reporting period, and an enable indicator for enhanced power headroom reporting.

In some examples of the method, apparatuses, or non-transitory computer-readable medium described herein, each of the plurality of configuration groups are associated with one or more of an enhanced power headroom reporting period, an enhanced power headroom reporting trigger threshold, or an enable indicator for enhanced power headroom reporting. Additionally or alternatively, in some examples the enhanced power headroom reporting configuration disables a power headroom reporting trigger associated with a change in measured path loss for at least one of the plurality of enhanced power headroom regions.

Some examples of the method, apparatuses, or non-transitory computer-readable medium described herein may include processes, features, means, or instructions for disabling a power headroom report within an enhanced power headroom region based at least in part on the enhanced power headroom reporting configuration.

A method of wireless communication at a UE is described. The method may include determining, based at least in part on a power headroom for the UE for uplink communications to a serving base station, that a triggering event for enhanced power headroom reporting has occurred, determining that the UE does not have uplink resources allocated for transmission of data to the serving base station, and sending uplink signaling to the serving base station comprising a request for uplink data resources.

An apparatus for wireless communication at a UE is described. The apparatus may include means for determining, based at least in part on a power headroom for the UE for uplink communications to a serving base station, that a triggering event for enhanced power headroom reporting has occurred, means for determining that the UE does not have uplink resources allocated for transmission of data to the serving base station, and means for sending uplink signaling to the serving base station comprising a request for uplink data resources.

A further apparatus for wireless communication at a UE is described. The apparatus may include a processor, memory in electronic communication with the processor, and instructions stored in the memory and operable, when executed by the processor, to cause the apparatus to determine, based at least in part on a power headroom for the UE for uplink communications to a serving base station, that a triggering event for enhanced power headroom reporting has occurred, determine that the UE does not have uplink resources allocated for transmission of data to the serving base station, and send uplink signaling to the serving base station comprising a request for uplink data resources.

A non-transitory computer-readable medium storing code for wireless communication at a UE is described. The code may include instructions executable to determine, based at least in part on a power headroom for the UE for uplink communications to a serving base station, that a triggering event for enhanced power headroom reporting has occurred, determine that the UE does not have uplink resources allocated for transmission of data to the serving base station, and send uplink signaling to the serving base station comprising a request for uplink data resources.

In some examples of the method, apparatuses, or non-transitory computer-readable medium described herein, the uplink signaling comprises a scheduling request or a random access request. Additionally or alternatively, some examples may include processes, features, means, or instructions for receiving an allocation of uplink resources for a data transmission to the serving base station, and transmitting the data transmission to the serving base station using the allocation of uplink resources, where the data transmission includes the power headroom. In some examples of the method, apparatuses, or non-transitory computer-readable medium described herein, transmitting the data transmission may further include transmitting an enhanced power headroom report using a media access control (MAC) layer control element.

Some examples of the method, apparatuses, or non-transitory computer-readable medium described herein may include processes, features, means, or instructions for resetting at least one timer associated with enhanced power headroom reporting based at least in part on transmitting the data transmission. Additionally or alternatively, in some examples the triggering event occurs at a media access control layer. Additionally or alternatively, in some examples the triggering event for enhanced power headroom reporting includes a change in measured path loss, a configuration of a power headroom report, a reconfiguration of a power headroom report, a cell reconfiguration, an expiration of a timer, or a combination thereof.

In some examples of the method, apparatuses, or non-transitory computer-readable medium described herein, the power headroom comprises an enhanced power headroom determined based at least in part on one or more of a predetermined number of uplink resources, a target modulation and coding scheme, a target signal to noise ratio, or a current coverage enhancement configuration. Additionally or alternatively, in some examples the request for uplink data resources includes a scheduling request (SR), a random access message, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
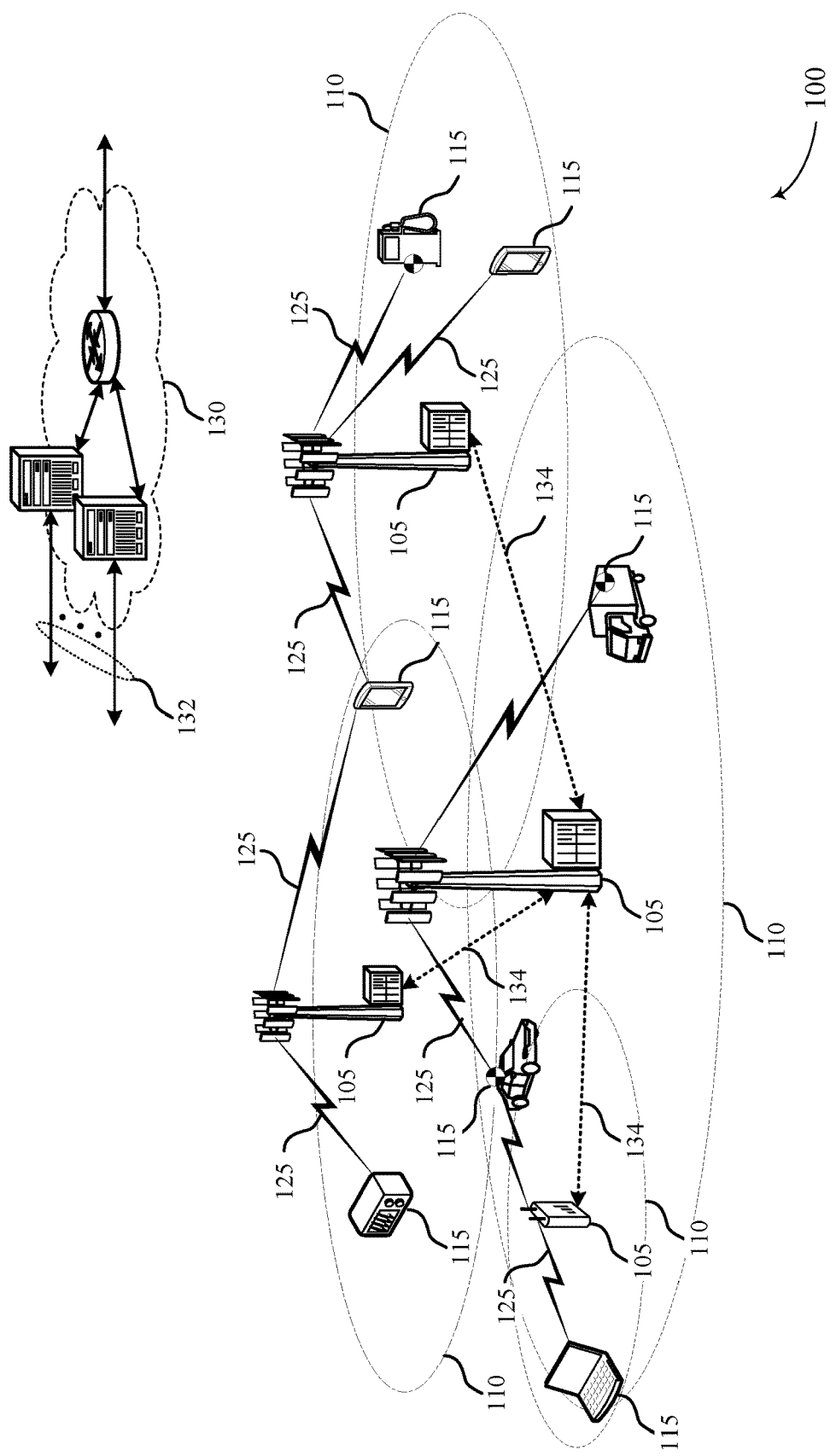
FIG. 1 illustrates an example of a wireless communications system in accordance with various aspects of the disclosure.

Some wireless systems may provide service for a category of low-cost or low-complexity UEs known as MTC devices. These devices may communicate with certain restrictions, which may be based on physical limitations, and which may include lower data rates, limited transport block size, half duplex operation, or relaxed switching time. Low-cost or low-complexity devices may also be provided or supported with coverage enhancements, which include repetition of transmissions in order to overcome the link budget limitations. Existing power headroom reporting (PHR) techniques may not provide efficient reporting of changes to channel conditions or device parameters to allow a base station to update coverage enhancement parameters.

Described systems and methods include techniques for enhanced power headroom reporting (ePHR). Techniques for ePHR may include triggering transmission of power headroom reports when a corresponding change to coverage enhancement (CE) level is likely to result. For example, an enhanced power headroom (ePH) may be monitored and reported based on changes in ePH relative to one or more ePHR regions. In some cases, an ePHR region may be defined based on a number of thresholds. For example, if there is a single threshold, two regions may be defined, one region below the threshold and one region above the threshold. According to some aspects, the ePH may be determined according to a reference format different from the PH value computed for a particular subframe associated with a data transmission. The ePH may be based on one or more of a predetermined number of uplink resources, a target modulation and coding scheme, a target signal to noise ratio, or a current coverage enhancement configuration. In some examples, legacy power headroom reporting may be disabled when ePHR is configured to reduce overhead.

The described techniques include configuration of multiple thresholds for ePHR reporting that define ePHR regions associated with CE levels. In some examples, an ePHR triggered at the MAC level is used to trigger sending a request for uplink data resources. In some examples, ePHR regions may be grouped into configuration groups and an ePHR configuration may be different for different configuration groups. For example, each configuration group may have different ePHR timers (e.g., prohibit timers, periodic reporting timers, etc.), or different ePHR trigger thresholds. Additionally or alternatively, ePHR reporting may be disabled for a configuration group (e.g., where a configuration group is associated with a fixed CE level, etc.).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for hybrid automatic repeat request (HARQ) status messages, physical downlink shared channel (PDSCH) for user data and physical multicast channel (PMCH) for multicast data. UL physical channels may include physical random access channel (PRACH) for access messages, PUCCH for control data, and physical uplink shared channel (PUSCH) for user data. PDCCH carries downlink control information (DCI), which may include information regarding DL scheduling assignments, UL resource grants, transmission scheme, UL power control (e.g., transmit power control (TPC) commands), HARQ information, modulation and coding scheme (MCS) and other information.

PUCCH may be used for UL acknowledgements (ACKs), scheduling requests (SRs) and channel quality indicators (CQI) and other UL control information. A PUCCH may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

As mentioned above, some types of wireless devices may provide for automated communication implementing M2M communications or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. UEs 115 may be or include MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, MTC devices may have limited capabilities. For example, while some MTC devices may have broadband capacity, other MTC devices may be limited to narrowband communications (e.g., limited to data transmission or reception using less than 6 physical resource blocks (PRBs), etc.) or reduced peak data rates (e.g., a maximum transport block size may be 1000 bits). In some wireless communication systems, an MTC device having limited bandwidth or data rate capability (or another device with similar capabilities) may be referred to as a "low cost" (LC) or category 0 device.

Additionally or alternatively, MTC devices may have limitations on the number of concurrently supported transport blocks (TBs). For example, an MTC device may not support reception of more than one unicast or broadcast TB in a subframe (e.g., concurrent reception of unicast and broadcast TBs not supported, etc.).

In some instances, coverage enhancements of such MTC devices may be employed to provide more reliable communications. Coverage enhancements may include, for example, power boosting (e.g., of up to 15 dB), and transmission repetition (e.g., TTI bundling to provide redundant versions of a transmission).

Transmission repetition provides multiple redundant versions of a transmission and may be used to enhance coverage for certain channels, such as the PUSCH, the PDSCH, an enhanced PDCCH (ePDCCH), the physical random access channel (PRACH), and/or PUCCH. For instance, various physical channels—including the PRACH and associated messages as well as paging messages—may be repeatedly transmitted from a wireless communications device. The number of repetitions may be determined by a coverage enhancement level, and coverage-enhanced MTC devices may be configured with a high level of repetition (e.g., 150 or more for a 328-bit payload). In some cases, the coverage enhancement level may be different for different channels.

Additionally or alternatively, random access responses and paging messages for LC MTC devices may be performed separately from other UEs. For example, different random access signaling procedures may be used, supporting repetition in different bundle sizes for random access responses and paging messages. According to some coverage enhancement techniques, LC MTC devices may be able to receive a legacy PBCH with additional repetition, and may transmit using a legacy PRACH format with additional repetition configured by the eNB. Such coverage enhancement techniques may include bundling levels for certain attempts, which may be selected based on one or more criteria, such as channel conditions or one or more prior failed access attempts, for example. In some examples, a certain number of attempts may be made at a first coverage enhancement level followed by a certain number of attempts at a second coverage level if attempts at the first level are unsuccessful. A number of attempts, a number of repetitions according to bundling coverage enhancement, or combinations thereof may be configured, according to various examples A UE 115 may coordinate transmit power (e.g., for PUCCH or PUSCH) with a serving base station to mitigate interference, improve the UL data rate, and prolong battery life. Uplink power control may include a combination of open-loop and closed-loop mechanisms. In open-loop power control, the UE 115 transmit power depends on estimates of the downlink path-loss and channel configuration. In closed-loop power control, the network can directly control the UE 115 transmit power using explicit power-control commands. Open-loop power control may be used for initial access, whereas both open and closed loop control may be used for UL control and data transmission. A UE 115 may determine power using an algorithm that takes into account a maximum transmission power limit, a target base station receive power, path loss, modulation and coding scheme (MCS), the number of resources used for transmission, and the format of the transmitted data (e.g., physical UL control channel (PUCCH) format). Power adjustments may be made by a base station 105 using TPC messages, which may incrementally adjust the transmit power of a UE 115 as appropriate.

The UE may use a power headroom (PH) reporting procedure to provide the serving eNB with information about the difference between the UE's maximum transmit power and the estimated power for a data transmission (e.g., power required for a PUSCH transmission). The reported PH information may be used by the eNB to manage uplink transmissions. For example, the reported PH information may be used by the eNB to determine transmit power using closed loop power control, to determine resource allocation among UEs, and to determine modulation and coding scheme (MCS) selection for uplink transmissions.

For example, PH for subframe i may be calculated by:

$$PH(i) = P_{CMAX} - \{10 \log_{10}(M_{PUSCH}(i)) + P_{O\_PUSCH}(j) + \alpha(j) \cdot PL + \Delta_{TF}(i) + f(i)\}$$

where:
$P_{CMAX}$ is the configured UE transmitted power;
$M_{PUSCH}(i)$ is the bandwidth of the PUSCH resource assignment expressed in number of resource blocks valid for subframe i.
$P_{O\_PUSCH}(j)$ is an offset determined based on a cell-specific offset and UE-specific components that vary by data transmission type j (e.g., dynamic, semi-persistent, (re)transmissions, etc.);
$\alpha(j)$ is a fractional power control constant that may be cell specific;
PL is the downlink path loss estimate calculated in the UE in dB, which may be determined based on a filtered RSRP;
$\Delta TF(i)$ is an MCS dependent offset that is based on a configured UE specific parameter deltaMCS-Enabled; and
f(i) is the current PUSCH power control adjustment state (e.g., accumulated TPC commands, etc.).

A power headroom report (PHR) may be triggered at the MAC layer based on a change in measured path loss (PL), configuration or reconfiguration of PHR, cell reconfiguration, and one or more reporting timers. For example, the MAC layer may generate a PHR when the PL has changed more than a configured threshold dl-PathLossChange and a prohibitPHR-Timer has expired, upon expiration of a periodicPHR-Timer, upon configuration or reconfiguration of PHR by upper layers, configuration or activation of additional cells for carrier aggregation, or a change in power backoff due to power management (e.g., greater than dl-PathLossChange). One or more timers may be set or reset following a transmission of data, for example. While the PHR is generated in the MAC layer based on the trigger, the PHR is transmitted in a MAC control element only when the UE has allocated uplink data resources (e.g., PUSCH resources). Because MTC devices in CE mode may be configured with repetition of control channel (e.g., PUCCH) and random access channel (e.g., PRACH) transmissions as well as data channel (e.g., PUSCH) transmissions, transmitting PHR only upon the allocation of data channel resources may also affect downlink transmissions subject to CE. While the eNB may use RRM measurements (e.g., periodic CSI, etc.) to detect the need for repetition level increase, PH may be a more accurate measure of the desired repetition level because it reflects both the UE path loss estimate as well as power control corrections sent by the eNB.

Components of the wireless communication system 100, such as the UEs 115 or eNBs 105, may be configured for enhanced power headroom reporting (ePHR). The ePHR may include triggering transmission of power headroom reports when a corresponding change to CE level is likely to result, instead of, or in addition to, typical triggers of the power headroom report described above, such as changes in measured path loss (PL), configuration or reconfiguration of PHR, cell reconfiguration, or expiration of one or more reporting timers. For example, the ePHR may be based on parameters more directly related to PH change instead of PL changes. In some examples, ePHR is associated with an ePH, determined according to a reference format different from the PH value computed for a particular subframe associated with a data transmission. The ePH may be based on one or more of a predetermined number of uplink resources, a target modulation and coding scheme, a target signal to noise ratio, or a current coverage enhancement configuration. In some examples, legacy PH reporting may be disabled when ePHR is configured to reduce overhead.

The UEs 115 may be configured with multiple thresholds for ePHR reporting that define ePHR regions associated with CE levels. An ePHR may be triggered when the ePH falls within a different region as the previous ePH. In some examples, an ePHR triggered at the MAC level is used to trigger sending a request for uplink data resources (e.g., SR or PRACH, etc.). In some examples, ePHR regions may be grouped into configuration groups and an ePHR configuration may be different for different configuration groups. For example, each configuration group may have different ePHR reporting periods, different ePHR trigger thresholds. Additionally or alternatively, ePHR reporting may be disabled for a configuration group (e.g., where a configuration group is associated with a fixed CE level, etc.).

Figure 2:
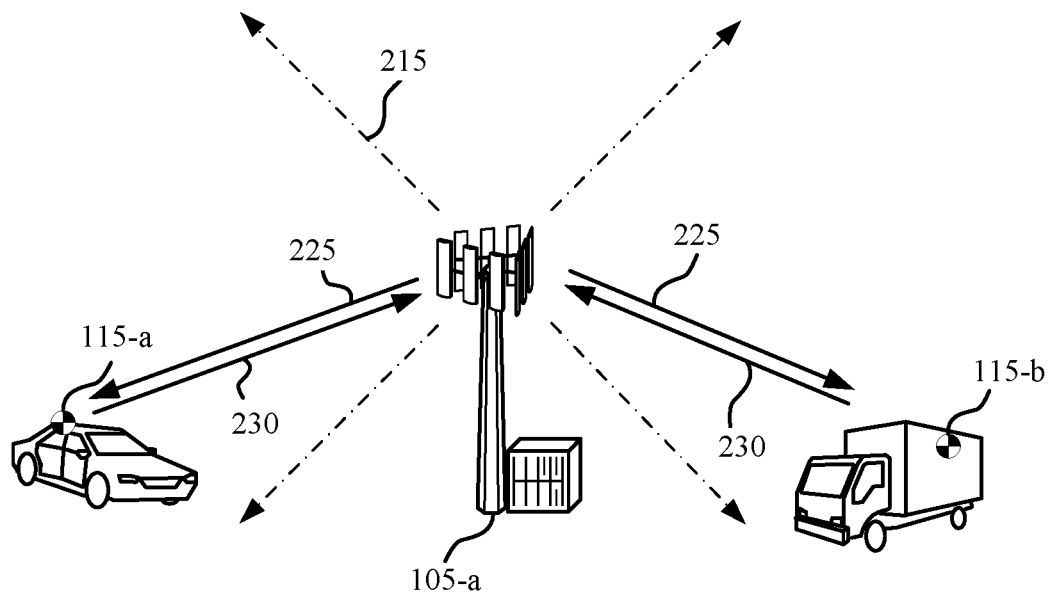
FIG. 2 illustrates an example of a wireless communications system in which enhanced power headroom reporting may be implemented in accordance with various aspects of the disclosure.

FIG. 2 illustrates an example of a wireless communications system 200 in which enhanced power headroom reporting may be implemented in accordance with various aspects of the disclosure. The wireless communication system 200 may be an example of portions of the wireless communication system 100 described with reference to FIG. 1. Moreover, eNB 105-a may be an example of aspects of one or more of the eNBs 105 described with reference to FIG. 1, while a first UE 115-a and a second UE 115-b, may be examples of aspects of one or more of the UEs 115 described with reference to FIG. 1.

In wireless communication environment 200, the eNB 105-a may transmit downlink data and control information to UEs 115-a and 115-b over downlink channels 225 and UEs 115-a and 115-b may transmit uplink data and control information to eNB 105-a over uplink channels 230. One or more of the UEs 115-a and 115-b may be an MTC device operating in a CE mode and may be configured with a CE level (e.g., number of repetitions over downlink channels 225 or uplink channels 230, etc.). In some instances, the UEs 115-a and 115-b may transmit power headroom reporting to the eNB 105-a over uplink channels 230, and the eNB 105-a may adjust CE levels in response to the power headroom report and transmit the CE configuration to the UEs 115-a and 115-b over downlink channels 225. The eNB 105-a may also transmit reference signals 215, which may include, for example, CRS, CSI-RS, IMR signals, PSS, SSS, and the like.

Figure 3:
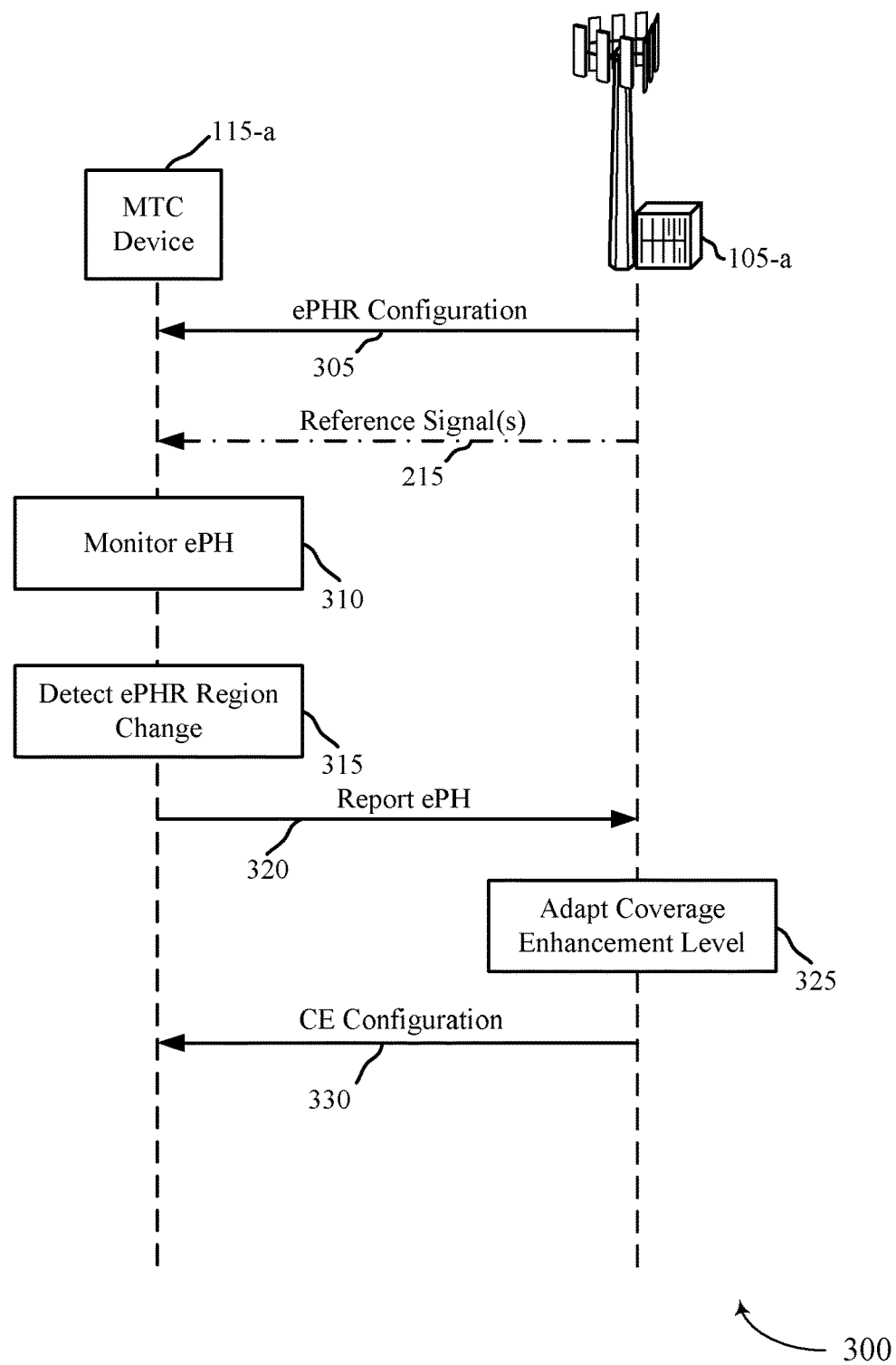
FIG. 3 illustrates an example process flow for enhanced power headroom reporting configuration and reporting in accordance with various aspects of the disclosure.

FIG. 3 illustrates an example process flow 300 for enhanced power headroom reporting configuration and reporting in accordance with various aspects of the disclosure. Process flow 300 may illustrate, for example, ePHR configuration and reporting for UE 115-a in wireless communication system 200.

In process flow 300, eNB 105-a sends ePHR configuration 305 to UE 115-a, which may be operating in a coverage enhancement mode (e.g., may be configured for transmission repetition for one or more UL or DL channels, etc.). The ePHR configuration 305 may indicate multiple ePHR regions for ePHR. For example, the ePHR configuration 305 may include multiple thresholds defining the ePHR regions. ePHR configuration 305 may also include other ePHR configuration parameters such as ePHR reporting periods, which may be configured by ePHR region. The ePHR configuration 305 may include a parameter for calculating an ePH and may configure the UE 115-a to monitor ePH according to the configured ePHR regions. The ePH may be, for example, determined according to a reference format that includes one or more of a fixed allocation (e.g., $M_{PUSCH}=6$, etc.), an MCS value, or an SNR target.

The UE 115-a monitors ePH at block 310 according to the ePHR configuration. Concurrently, the UE 115-a may transmit or receive data and/or control information. For example, monitoring ePH at block 310 may coincide with one or more downlink or uplink data transmissions. For uplink data transmissions, the UE 115-a may receive closed-loop power control commands (e.g., TPC commands, etc.), which may be directly reflected in computing power headroom.

At block 315, the UE 115-a may detect that the ePH has crossed an ePHR region boundary. For example, the UE 115-a may determine that the current ePH falls into a different ePHR region than the previous ePH. Upon detection of the change in ePHR region, the UE 115-a may trigger an ePHR (e.g., at the MAC level). In some examples, the ePHR trigger may trigger a request for uplink data resources, as discussed in more detail below.

The UE 115-a may transmit ePH report 320 to eNB 105-a. The ePH report 320 may be transmitted as a MAC control element included in a data transmission to the eNB 105-a. The MAC control element may indicate an ePH value using one or more of the reserved bits in the power headroom MAC control element.

At block 325, the eNB 105-a may adapt the CE level for the UE 115-a based on the ePH report 320. For example, based on the ePH report 320 the eNB 105-a may determine that a repetition level for uplink or downlink channels should be increased or decreased. The eNB 105-a may transmit a CE configuration 330 to the UE 115-a including the updated CE levels.

Figure 4:
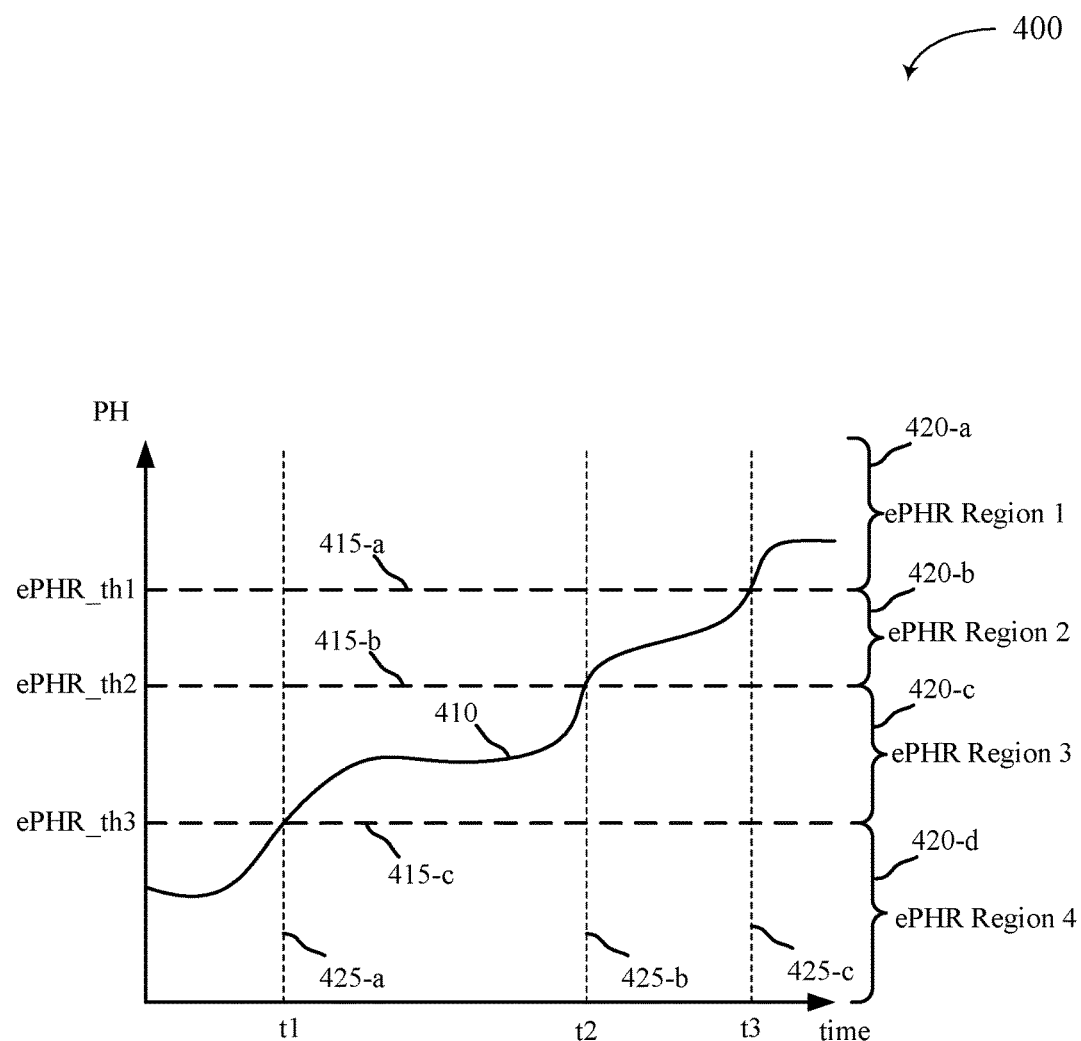
FIG. 4 illustrates an example timing diagram of enhanced power headroom reporting triggering in accordance with various aspects of the disclosure.

FIG. 4 illustrates an example timing diagram 400 of enhanced power headroom reporting triggering in accordance with various aspects of the disclosure. Timing diagram 400 may illustrate, for example, ePHR triggering for a UE 115 of wireless communication systems 100 or 200 of FIG. 1 or 2.

The UE 115 may be configured with four ePHR regions 420 based on ePHR thresholds 415. For example, ePHR region 1 420-a may be the region corresponding to ePH values between ePHR_th1 415-a and a maximum ePH value (e.g., 40 dB, etc.). Similarly, ePHR region 2 420-b may be the region corresponding to ePH values between ePHR_th2 415-b and ePHR_th1 415-a while ePHR region 3 420-c may be the region corresponding to ePH values between ePHR_th3 415-c and ePHR_th2 415-b. Lastly, ePHR region 4 420-d may be the region corresponding to ePH values between a minimum ePH value (e.g., −23 dB, etc.) and ePHR_th3 415-c. Additional ePHR regions 420 may be defined using additional ePHR_thresholds 415. Within each PHR region 420, legacy PHR and ePHR may be independently enabled or disabled. For example, disabling legacy PHR may reduce overhead where reporting of ePHR is triggered when changes of CE level are likely to occur.

In some examples, the calculated ePH 410 may be determined according to a reference format that includes one or more of a fixed allocation, an MCS value, or an SNR target, and may be independent of subframe-specific UL resource allocations or UL data transport blocks. For example, ePH 410 may be given by:

$$ePH = P_{CMAX} - \{10 \log_{10}(M_{PUSCH\_ePHR}) + P_{O\_PUSCH\_ePHR} + \alpha_{ePHR} \cdot PL + \Delta_{ePHR} + f\}$$

where:

$P_{CMAX}$ is the configured UE transmitted power;

$M_{PUSCH\_ePHR}$ is a fixed allocation (e.g., 6 RBs, etc.);

$P_{O\_PUSCH\_ePHR}$ is an offset determined based on a cell-specific offset and UE-specific components. In some examples, $P_{O\_PUSCH\_ePHR} = P_{O\_PUSCH}(0)$;

$\alpha_{ePHR}$ is a fractional power control constant. In some cases, $\alpha_{ePHR} = \alpha(0)$;

$\Delta_{ePHR}$ is an offset based on MCS (e.g., MCS of last UL data transmission, etc.) or SNR target; and f is the current PUSCH power control adjustment state (e.g., accumulated TPC commands, etc.).

The calculated ePH 410 may initially be in ePHR region 4 420-d and at time t1 425-a the calculated ePH 410 may cross ePHR_threshold 415-c to be in ePHR region 3 420-c. The UE 115 may detect the transition of the ePH 410 from ePHR region 4 420-d to ePHR region 3 420-c at time 425-a and trigger an ePHR. Similarly, ePHRs may be triggered upon the transitions of the ePH 410 from ePHR region 3 420-c to ePHR region 2 420-b at time 425-b and from ePHR region 2 420-b to ePHR region 1 420-a at time 425-c.

Figure 5:
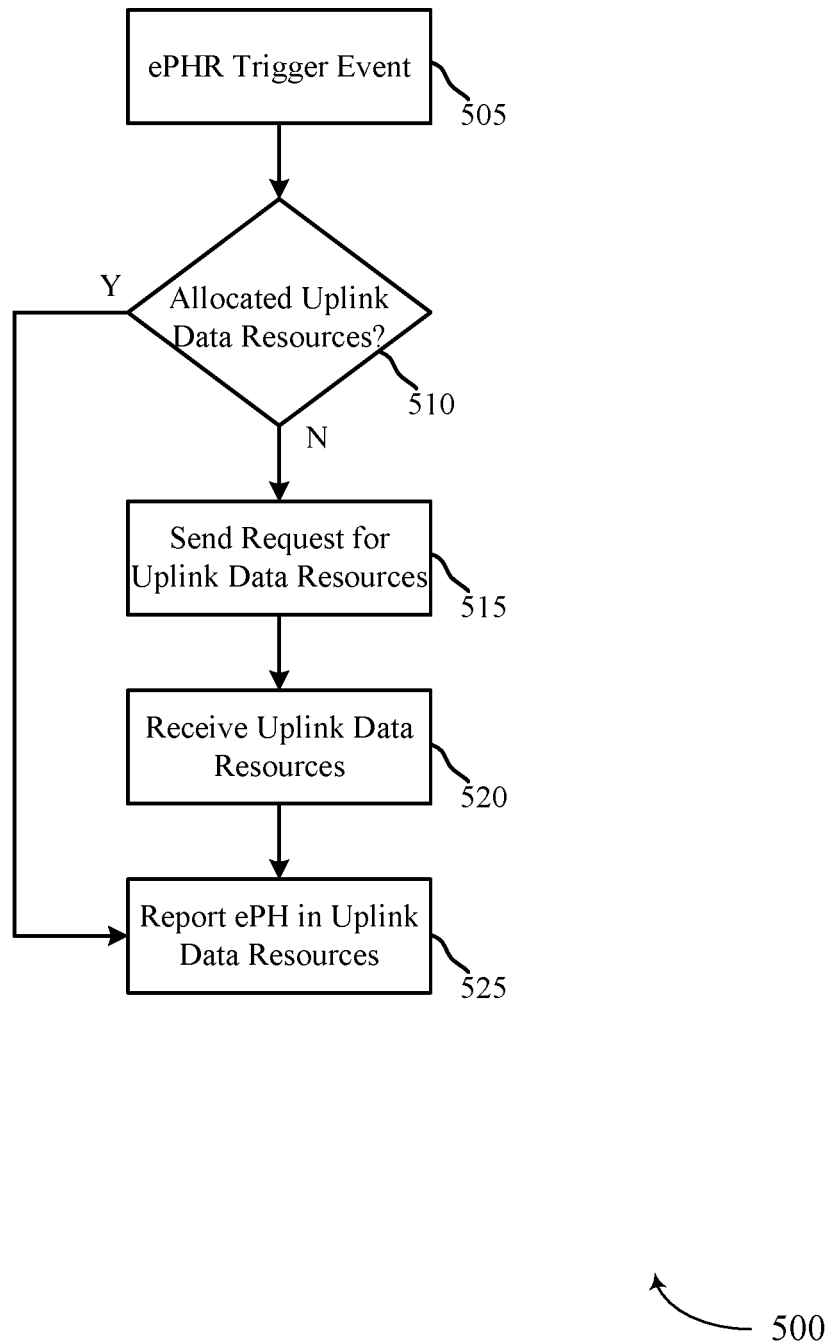
FIG. 5 illustrates a process flow for an enhanced power headroom reporting trigger event in accordance with various aspects of the disclosure.

FIG. 5 illustrates a process flow 500 for an enhanced power headroom reporting trigger event in accordance with various aspects of the disclosure. The process flow 500 may be performed by the UE 115 of FIG. 1, 2, or 3. Process flow 500 may illustrate, for example, reporting of ePH report 320 of FIG. 3 or ePH reporting based on ePHR event triggering as discussed with reference to FIG. 3 or 4. In some examples, a UE 115 may execute one or more sets of codes to control the functional elements of the UE 115 to perform the functions described below. Additionally or alternatively, the UE 115 may perform one or more of the functions described below using special-purpose hardware.

At block 505 of process flow 500, an ePHR trigger event occurs. The ePHR trigger event may occur, for example, when the current ePH falls into a different ePHR region than the previous ePH as described above.

At block 510, the UE 115 may determine whether it has UL resources allocated for a new uplink data transmission. For example, the UE 115 may determine whether an UL allocation has been received for a future subframe.

If, at block 510, the UE 115 determines that UL resources are allocated for a new uplink data transmission, process flow 500 may proceed to block 525, where the UE 115 may generate an ePHR MAC control element and pass the ePHR MAC control element to a MAC multiplexing component for transmission by the physical layer in the uplink data transmission.

If, at block 510, the UE 115 determines that no UL resources are allocated for new uplink data transmissions, process flow 500 may proceed to block 515, where the UE 115 may send a request for uplink data resources. For example, the UE 115 may send a scheduling request (SR) (if configured for the UE 115), or random access message (e.g., PRACH).

The UE 115 may receive an allocation of UL resources at block 520 and process flow 500 may proceed to block 525, where the UE 115 may generate an ePHR MAC control element and pass the ePHR MAC control element to a MAC multiplexing component for transmission by the physical layer in the uplink data transmission.

At block 525, the MTC device may also reset timers associated with ePHR reporting. For example, ePHR reporting may be configured with one or more ePHR timers (e.g., prohibit ePHR-Timer, periodic ePHR-Timer), which may be used in determining the ePHR triggering event at block 505. For example, if the current ePH falls into a different ePHR region than the previous ePH at block 505 but the prohibit ePHR-Timer is not expired, block 505 may wait until the expiration of the prohibit ePHR-Timer to perform ePHR triggering. Additionally or alternatively, expiration of the periodic ePHR-Timer at block 505 may trigger the ePHR triggering event at block 505. The UE 115 may reset the ePHR timers. The ePHR timers may be configured separately for ePHR regions, or may be configured differently for different ePHR region configuration groups, in some cases.

Figure 6:
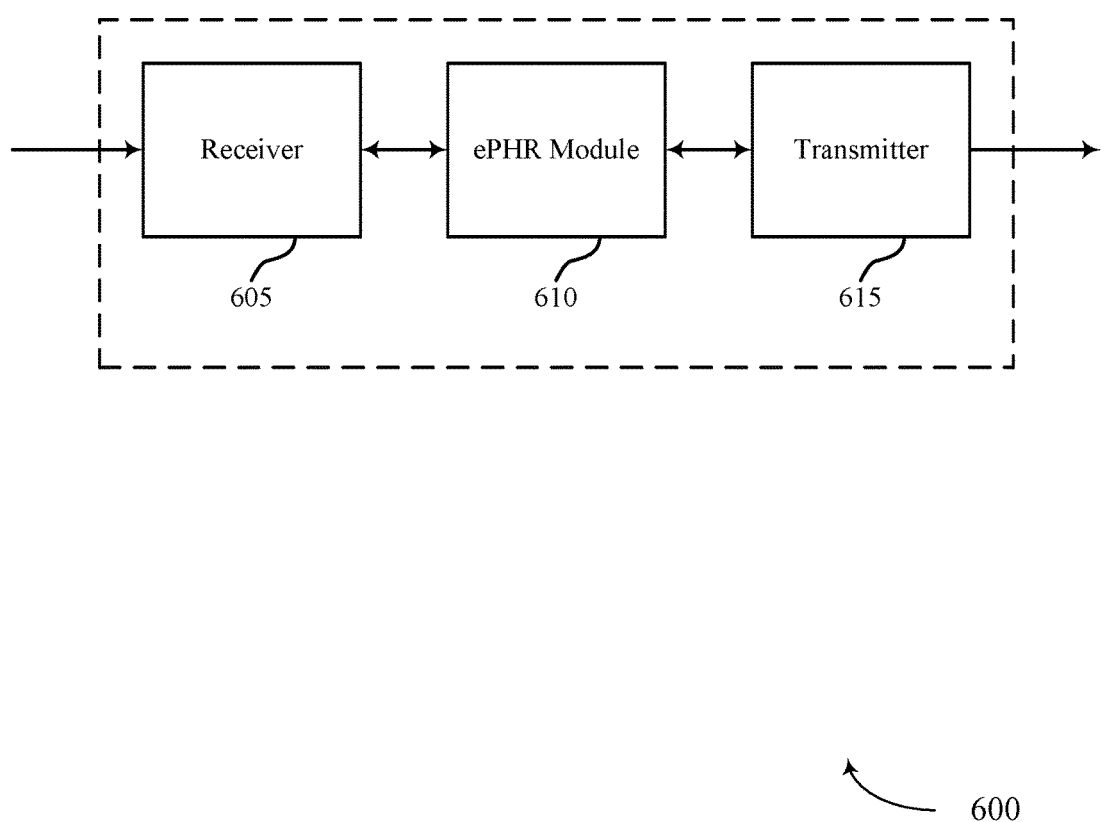
FIG. 6 shows a block diagram of a wireless device configured for enhanced power headroom reporting in accordance with various aspects of the present disclosure.

FIG. 6 shows a block diagram of a wireless device 600 configured for enhanced power headroom reporting in accordance with various aspects of the present disclosure. Wireless device 600 may be an example of aspects of a UE 115 described with reference to FIGS. 1-4. Wireless device 600 may include a receiver 605, an ePHR module 610, or a transmitter 615. Wireless device 600 may also include a processor. Each of these components may be in communication with each other.

The receiver 605 may receive information such as packets, user data, or control information associated with various information channels (e.g., control channels, data channels, and information related to enhanced power headroom reporting, etc.). Information may be passed on to the ePHR module 610, and to other components of wireless device 600.

The ePHR module 610 may receive, from a serving base station, an enhanced power headroom reporting configuration comprising a plurality of enhanced power headroom regions, determine that a current power headroom is associated with a different one of the plurality of enhanced power headroom regions than a previous power headroom, and report the current power headroom to the serving base station. The ePHR module 610 may trigger an ePHR at the MAC level, which may be used to trigger sending a request for uplink data resources (e.g., SR or PRACH, etc.).

The transmitter 615 may transmit signals received from other components of wireless device 600. In some examples, the transmitter 615 may be collocated with the receiver 605 in a transceiver module. The transmitter 615 may include a single antenna, or it may include a plurality of antennas.

Figure 7:
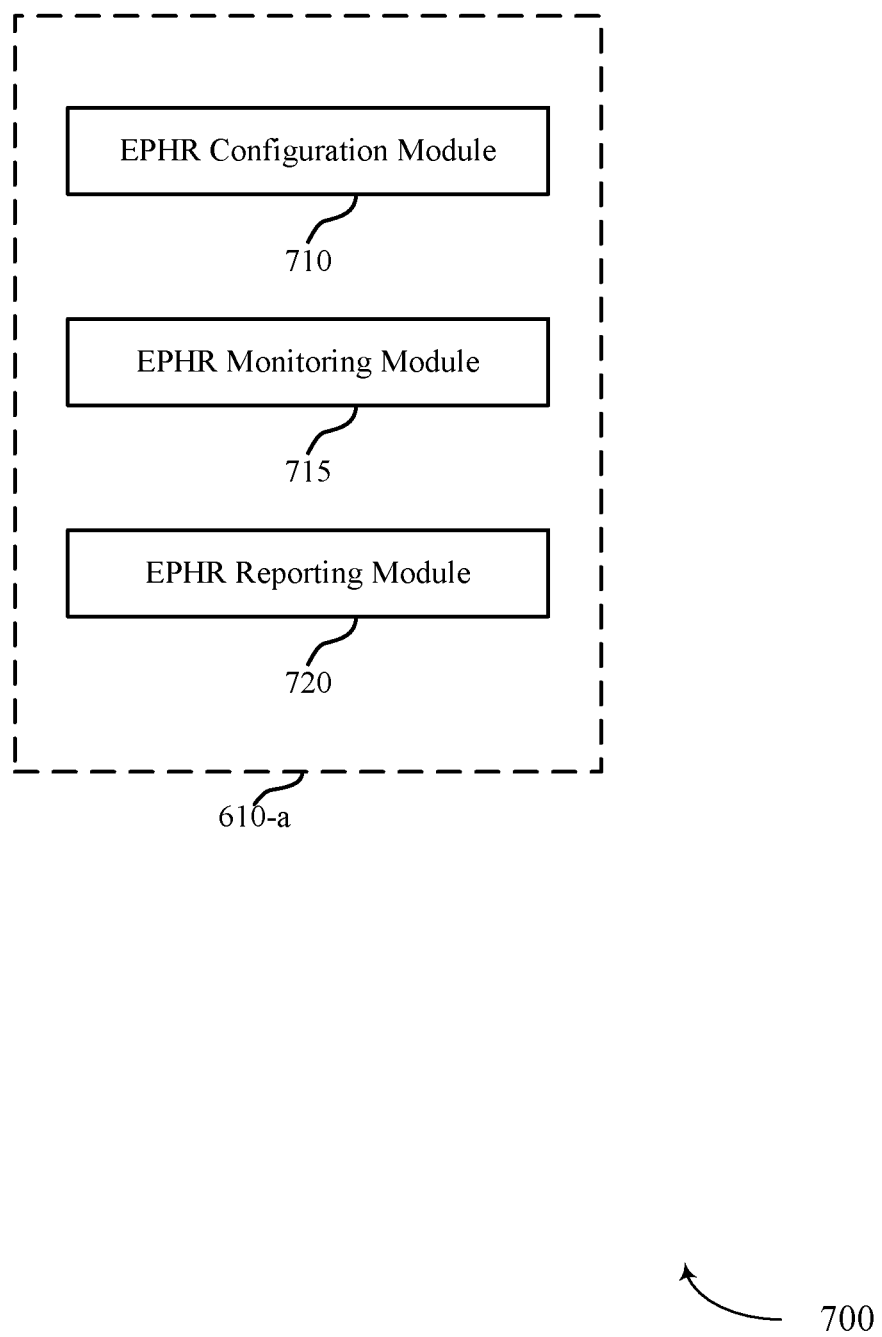
FIG. 7 shows a block diagram of a wireless device for enhanced power headroom reporting in accordance with various aspects of the present disclosure.

FIG. 7 shows a block diagram of a wireless device 700 for enhanced power headroom reporting in accordance with various aspects of the present disclosure. Wireless device 700 may be an example of aspects of wireless device 600 of FIG. 6 or a UE 115 described with reference to FIGS. 1-5. Wireless device 700 may include an ePHR module 610-a and may also include a processor. The ePHR module 610-a may also include an ePHR configuration module 710, an ePHR monitoring module 715, and an ePHR reporting module 720. Each of these components may be in communication with each other.

The ePHR configuration module 710 may receive, from a serving base station, an ePHR configuration comprising a plurality of ePH regions as described with reference to FIGS. 2-5. In some examples, the enhanced power headroom reporting configuration comprises a plurality of configuration groups, each of the plurality of configuration groups comprising one or more of the plurality of enhanced power headroom regions. In some examples, each of the plurality of configuration groups are associated with one or more of an ePHR period, an ePHR trigger threshold, or an enable indicator for ePHR. In some examples, the enhanced power headroom reporting configuration disables a PHR trigger associated with a change in measured path loss for at least one of the plurality of ePHR regions.

The ePHR monitoring module 715 may determine that a current power headroom is associated with a different one of the plurality of enhanced power headroom regions than a previous power headroom as described with reference to FIGS. 2-4. In some examples, the current power headroom is an ePH determined based at least in part on one or more of a predetermined number of uplink resources, a target modulation and coding scheme, a target signal to noise ratio, or a current coverage enhancement configuration as described above with reference to FIG. 4.

The ePHR reporting module 720 may report the current power headroom to the serving base station as described with reference to FIGS. 2-5.

Figure 8:
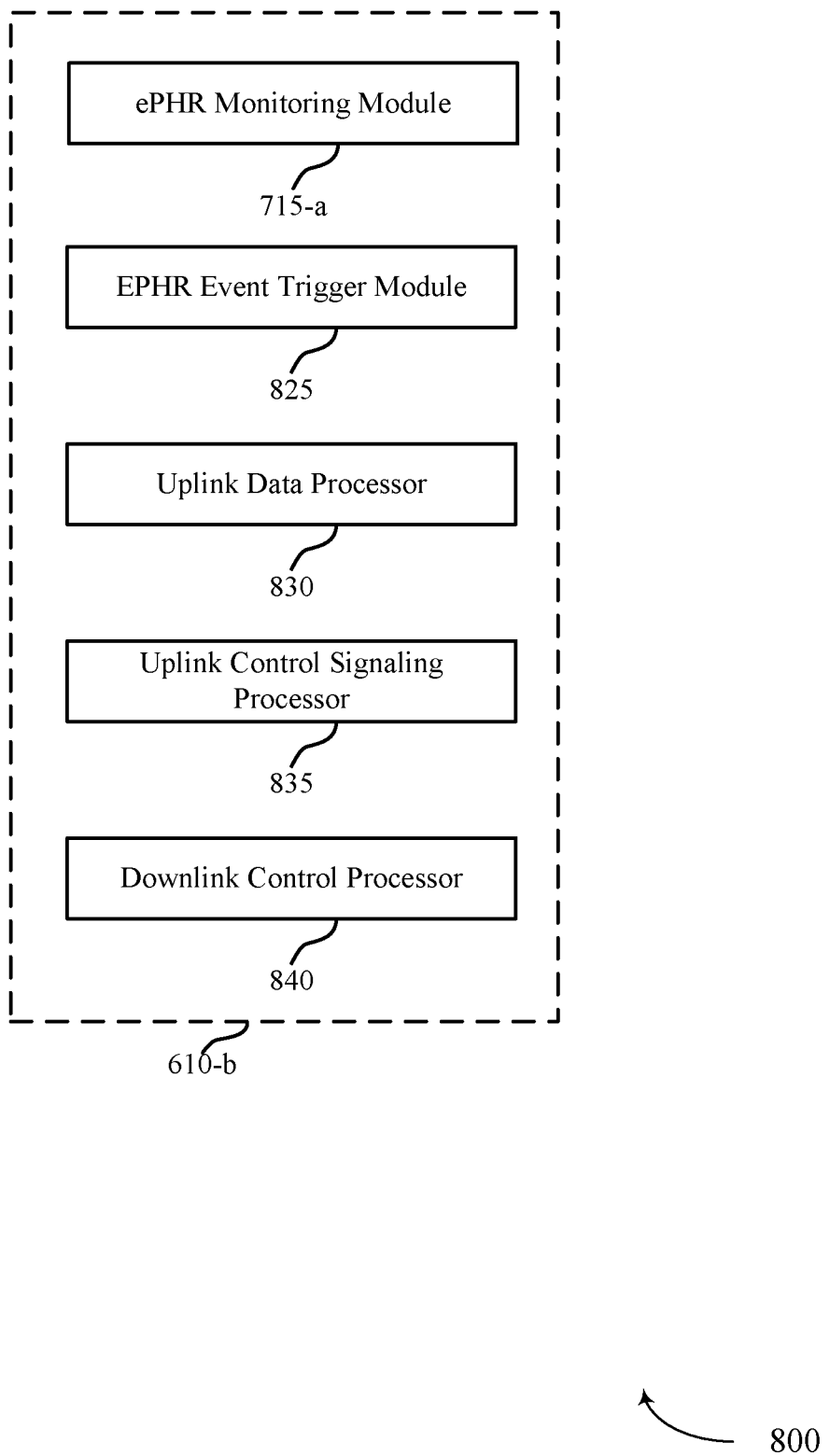
FIG. 8 shows a block diagram of a wireless device for enhanced power headroom reporting in accordance with various aspects of the present disclosure.

FIG. 8 shows a block diagram of a wireless device 800 for enhanced power headroom reporting in accordance with various aspects of the present disclosure. Wireless device 800 may be an example of aspects of wireless device 600 of FIG. 6 or a UE 115 described with reference to FIGS. 1-5. Wireless device 800 may include an ePHR module 610-*b* and may also include a processor. The ePHR module 610-*b* may include an ePHR event trigger module 825, an uplink data processor 830, an uplink control signaling processor 835, a downlink control processor 840 or an ePHR monitoring module 715-*a*. Each of these components may be in communication with each other.

The ePHR event trigger module 825 may determine, based at least in part on a power headroom for the UE for uplink communications to a serving base station, that a triggering event for enhanced power headroom reporting has occurred as described with reference to FIGS. 2-5.

The uplink data processor 830 may determine that the UE does not have uplink resources allocated for transmission of data to the serving base station as described with reference to FIGS. 2-5. The uplink data processor 830 may also transmit the data transmission to the serving base station using the allocated uplink resources, the data transmission comprising the power headroom.

The uplink control signaling processor 835 may send uplink signaling to the serving base station comprising a request for uplink data resources as described with reference to FIGS. 2-5. In some examples, the uplink signaling comprises a scheduling request or a random access request.

The downlink control signaling processor 840 may receive an allocation of uplink resources for a data transmission to the serving base station as described with reference to FIGS. 2-5.

The ePHR monitoring module 715-*a* may be an example of ePHR monitoring module 715 described with reference to FIG. 7. The ePHR monitoring module 715-*a* may be configured such that the monitored power headroom is an ePH determined based at least in part on one or more of a predetermined number of uplink resources, a target modulation and coding scheme, a target signal to noise ratio, or a current coverage enhancement configuration as described with reference to FIG. 4.

Figure 9:
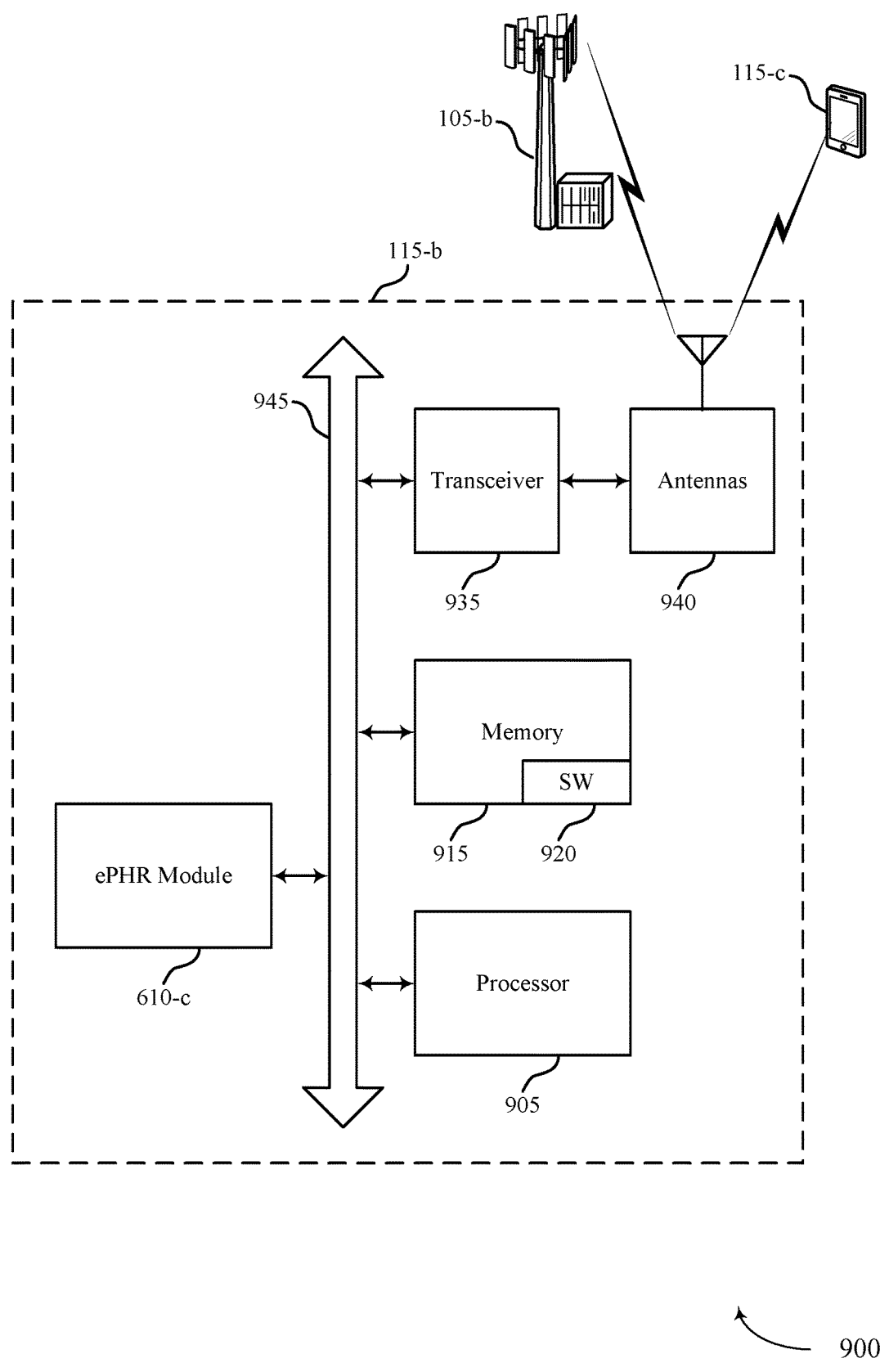
FIG. 9 shows a diagram of a system including a UE configured for enhanced power headroom reporting for low cost MTC in accordance with various aspects of the present disclosure.

FIG. 9 shows a diagram of a system 900 including a UE 115 configured for power headroom reporting for low cost MTC in accordance with various aspects of the present disclosure. System 900 may include UE 115-*b*, which may be an example of wireless devices 600, 700, or 800 of FIGS. 6-8 or UEs 115 described with reference to FIGS. 1-5. UE 115-*b* may include an ePHR module 610-*c*, which may be an example of ePHR modules 610 described with reference to FIGS. 6-8. UE 115-*b* may also include components for bi-directional voice and data communications including components for transmitting communications and components for receiving communications. For example, UE 115-*b* may communicate bi-directionally with eNB 105-*b* or UE 115-*c*.

UE 115-*b* may also include a processor 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*b* may include a single antenna 940, UE 115-*b* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., enhanced power headroom reporting for low cost MTC, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

Figure 10:
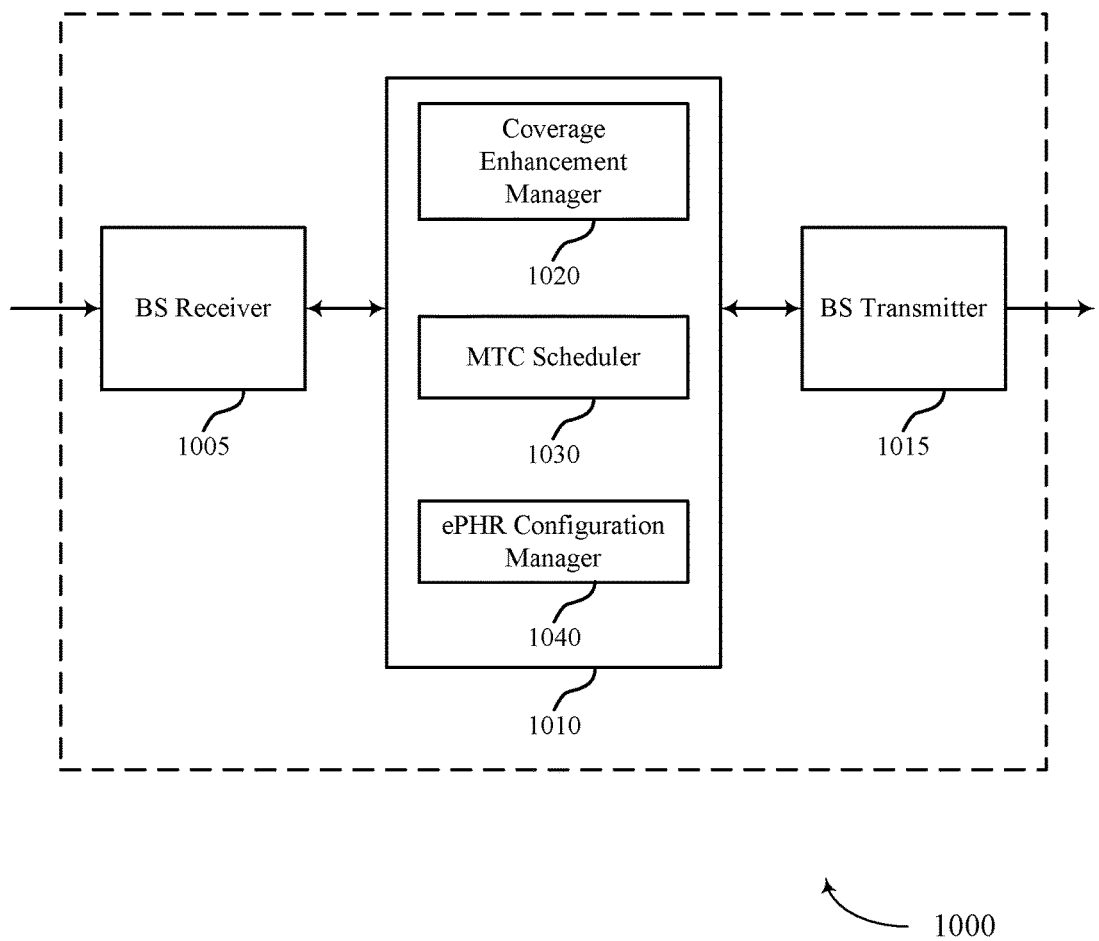
FIG. 10 shows a block diagram of a wireless device for enhanced power headroom reporting for low cost MTC devices in accordance with various aspects of the present disclosure.

FIG. 10 shows a block diagram of a wireless device 1000 for power headroom reporting for low cost MTC in accordance with various aspects of the present disclosure. Wireless device 1000 may be an example of aspects of a base station 105 described with reference to FIGS. 1-6. Wireless device 1000 may include a BS receiver 1005, an MTC manager 1010, or a BS transmitter 1015. Wireless device 1000 may also include a processor. The MTC manager 1010 may also include a coverage enhancement manager 1020, an MTC scheduler 1030, or an ePHR configuration manager 1040. Each of these components may be in communication with each other.

The BS receiver 1005 may receive information which may be passed on to MTC manager 1010, and to other components of wireless device 1000. The MTC manager 1010 may perform the operations described with reference to FIG. 12. For example, the BS receiver 1005 may receive a power headroom report (e.g., ePHR, etc.) from a UE as described with reference to FIGS. 2-5. The transmitter 1015 may transmit signals received from other components of wireless device 1000.

The coverage enhancement manager 1020 may determine a coverage enhancement level for the UE based at least in part on the received power headroom report as described with reference to FIGS. 2-5.

The MTC scheduler 1030 may send a coverage enhancement configuration to the UE based at least in part on the determined coverage enhancement level as described with reference to FIGS. 2-5. In some examples, the coverage enhancement configuration comprises a number of transmission repetitions associated with the coverage enhancement level.

Figure 11:
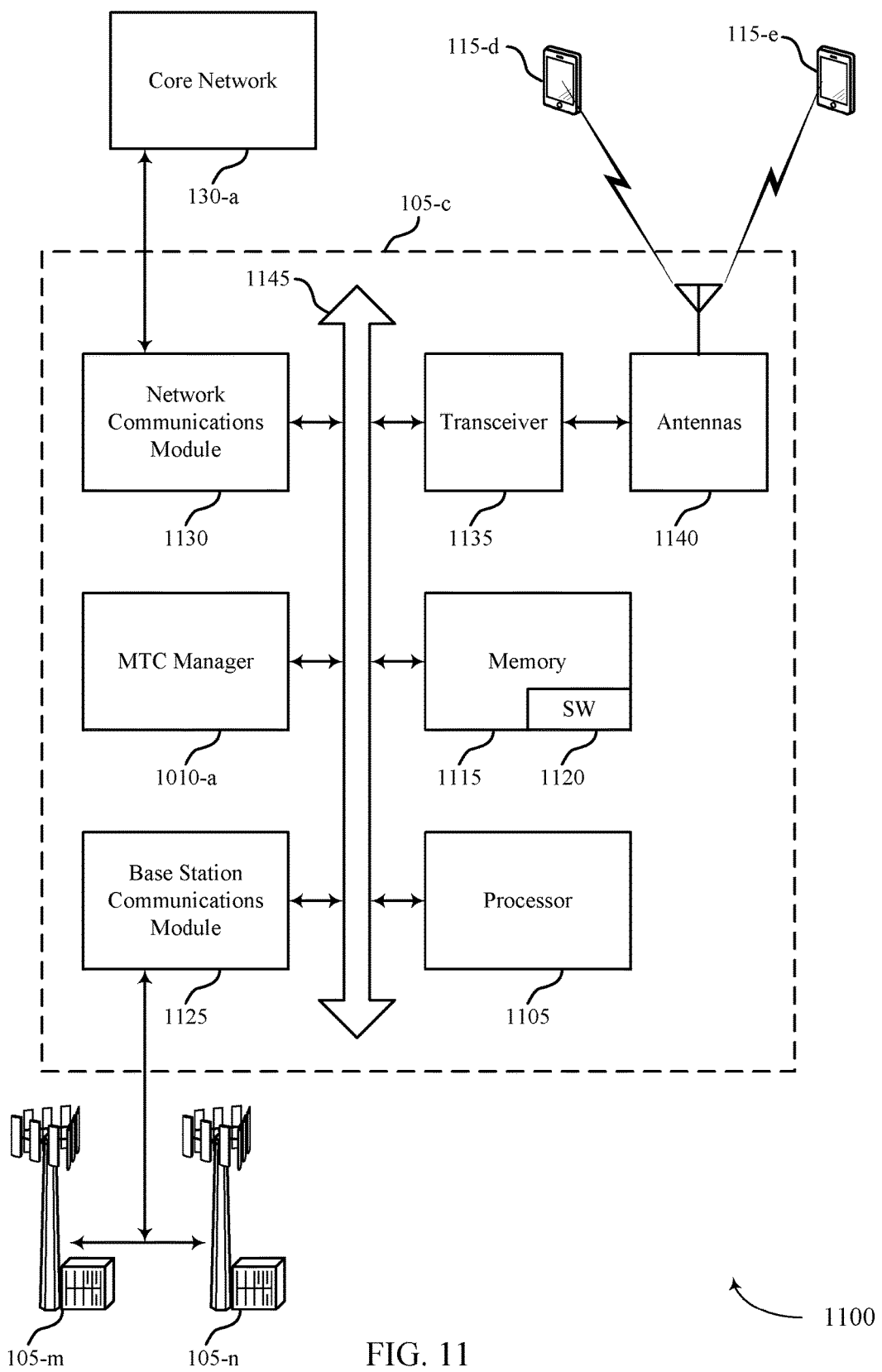
FIG. 11 shows a diagram of a system including a base station configured for power headroom reporting for low cost MTC devices in accordance with various aspects of the present disclosure.

The ePHR configuration manager 1040 may configure UEs for enhanced power headroom reporting according to ePHR regions. For example, the ePHR configuration manager may send an enhanced power headroom reporting configuration to a UE operating in a coverage enhancement mode, the enhanced power headroom reporting configuration comprising one or more of a parameter for calculating an enhanced power headroom, an enhanced power headroom reporting period, or one or more thresholds associated with one or more enhanced power headroom reporting regions FIG. 11 shows a diagram of a system 1100 including a base station 105 configured for power headroom reporting for low cost MTC devices in accordance with various aspects of the present disclosure. System 1100 may include base station 105-c, which may be an example of a wireless device 1000 or a base station 105 described with reference to FIGS. 1-5. Base Station 105-c may include MTC Manager 1010-a, which may be an example of MTC Manager 1010 described with reference to FIG. 10. Base Station 105-c may also include components for bi-directional voice and data communications including components for transmitting communications and components for receiving communications. For example, base station 105-c may communicate bi-directionally with UE 115-d or UE 115-e, which may be or include MTC devices.

In some cases, base station 105-c may have one or more wired backhaul links. Base station 105-c may have a wired backhaul link (e.g., S1 interface, etc.) to the core network 130-a. Base station communication module 1125 of base station 105-c may also communicate with other base stations 105, such as base station 105-m and base station 105-n via inter-base station backhaul links (e.g., an X2 interface). Additionally or alternatively, base station 105-c may communicate with other base stations through core network 130 (e.g., via network communications module 1130). Each of the base stations 105 may communicate with UEs 115 using the same or different wireless communications technologies.

The base station 105-c may include a processor 1105, memory 1115 (including software (SW) 1120), transceiver 1135, and antenna(s) 1140, which each may be in communication, directly or indirectly, with one another (e.g., over bus system 1145). The transceivers 1135 may be configured to communicate bi-directionally, via the antenna(s) 1140, with the UEs 115, which may be multi-mode devices. The transceiver 1135 (or other components of the base station 105-c) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-c may include multiple transceivers 1135, each with one or more associated antennas 1140. The transceiver may be an example of a combined receiver 1005 and transmitter 1015 of FIG. 10.

The memory 1115 may include RAM and ROM. The memory 1115 may also store computer-readable, computer-executable software code 1120 containing instructions that are configured to, when executed, cause the processor 1105 to perform various functions described herein (e.g., power headroom reporting for low cost MTC devices, selecting coverage enhancement techniques, call processing, database management, message routing, etc.). Alternatively, the software 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc.

The processor 1105 may include various special purpose processors such as encoders, queue processing modules, base band processors, radio head controllers, digital signal processor (DSPs), and the like.

The base station communications module 1125 may manage communications with other base stations 105. In some cases, a communications management module may include a controller or scheduler for controlling communications with UEs 115 in cooperation with other base stations 105. For example, the base station communications module 1125 may coordinate scheduling for transmissions to UEs 115 for various interference mitigation techniques such as beamforming or joint transmission.

The components of wireless devices 600, 700, 800, 1000 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 12:
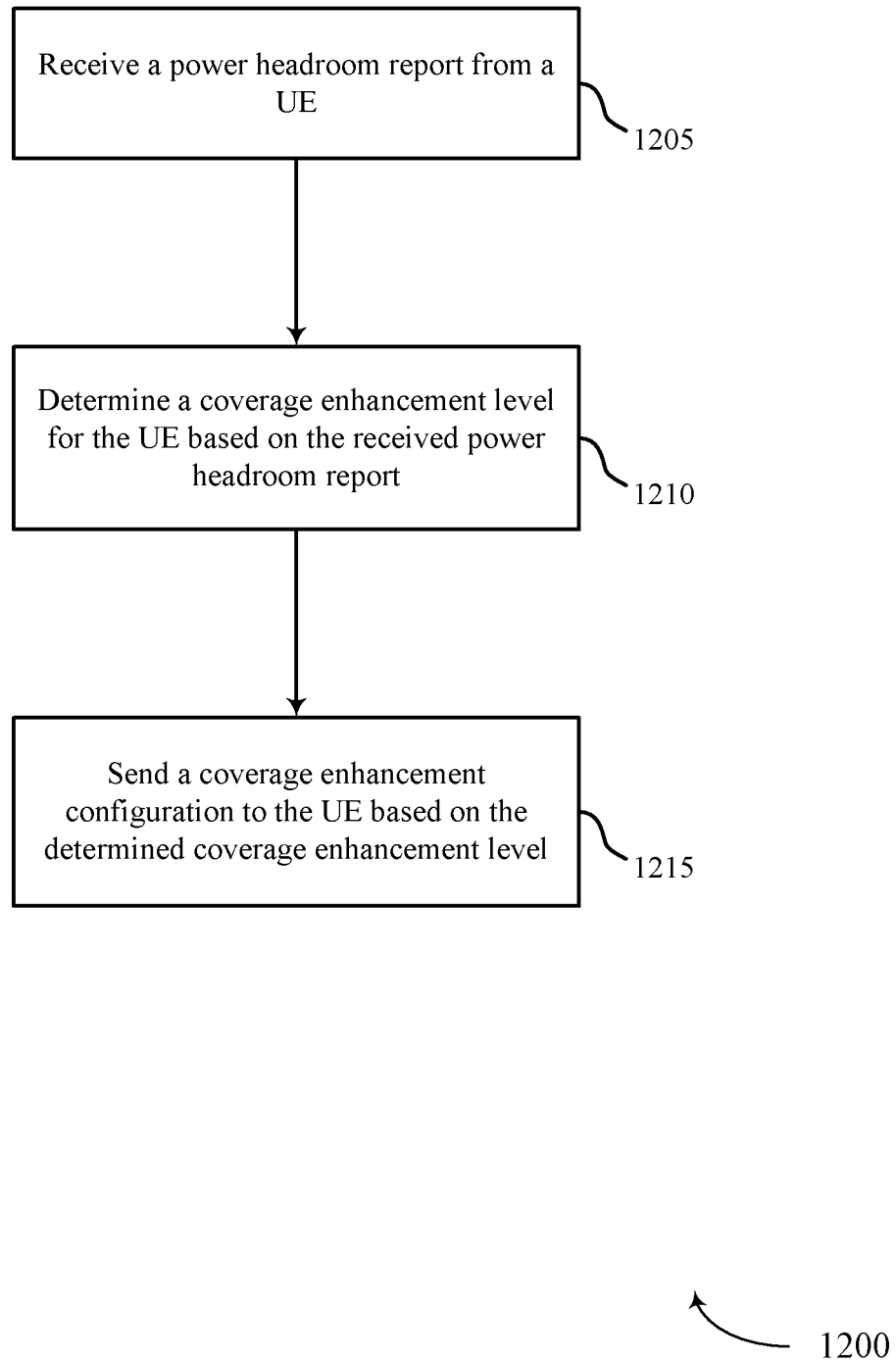
FIG. 12 shows a flowchart illustrating a method for enhanced power headroom reporting for low cost MTC devices in accordance with various aspects of the present disclosure.

FIG. 12 shows a flowchart illustrating a method 1200 for enhanced power headroom reporting for low cost MTC devices in accordance with various aspects of the present disclosure. The operations of method 1200 may be implemented by a base station 105 or its components as described with reference to FIGS. 1-5, 10 and 11. For example, the operations of method 1200 may be performed by MTC Managers 1010 as described with reference to FIG. 10 or 11. In some examples, a base station 105 may execute a set of codes to control the functional elements of the base station 105 to perform the functions described below. Additionally or alternatively, the base station 105 may perform aspects the functions described below using special-purpose hardware.

At block 1205, the base station 105 may receive a power headroom report from a UE as described with reference to FIGS. 2-5. In certain examples, the operations of block 1205 may be performed by the receiver 1005 as described with reference to FIG. 10.

At block 1210, the base station 105 may determine a coverage enhancement level for the UE based at least in part on the received power headroom report as described with reference to FIGS. 2-5. In certain examples, the operations of block 1210 may be performed by the coverage enhancement manager 1020 as described with reference to FIG. 10.

At block 1215, the base station 105 may send a coverage enhancement configuration to the UE based at least in part on the determined coverage enhancement level as described with reference to FIGS. 2-5. In certain examples, the operations of block 1215 may be performed by the MTC scheduler 1030 as described with reference to FIG. 10.

Figure 13:
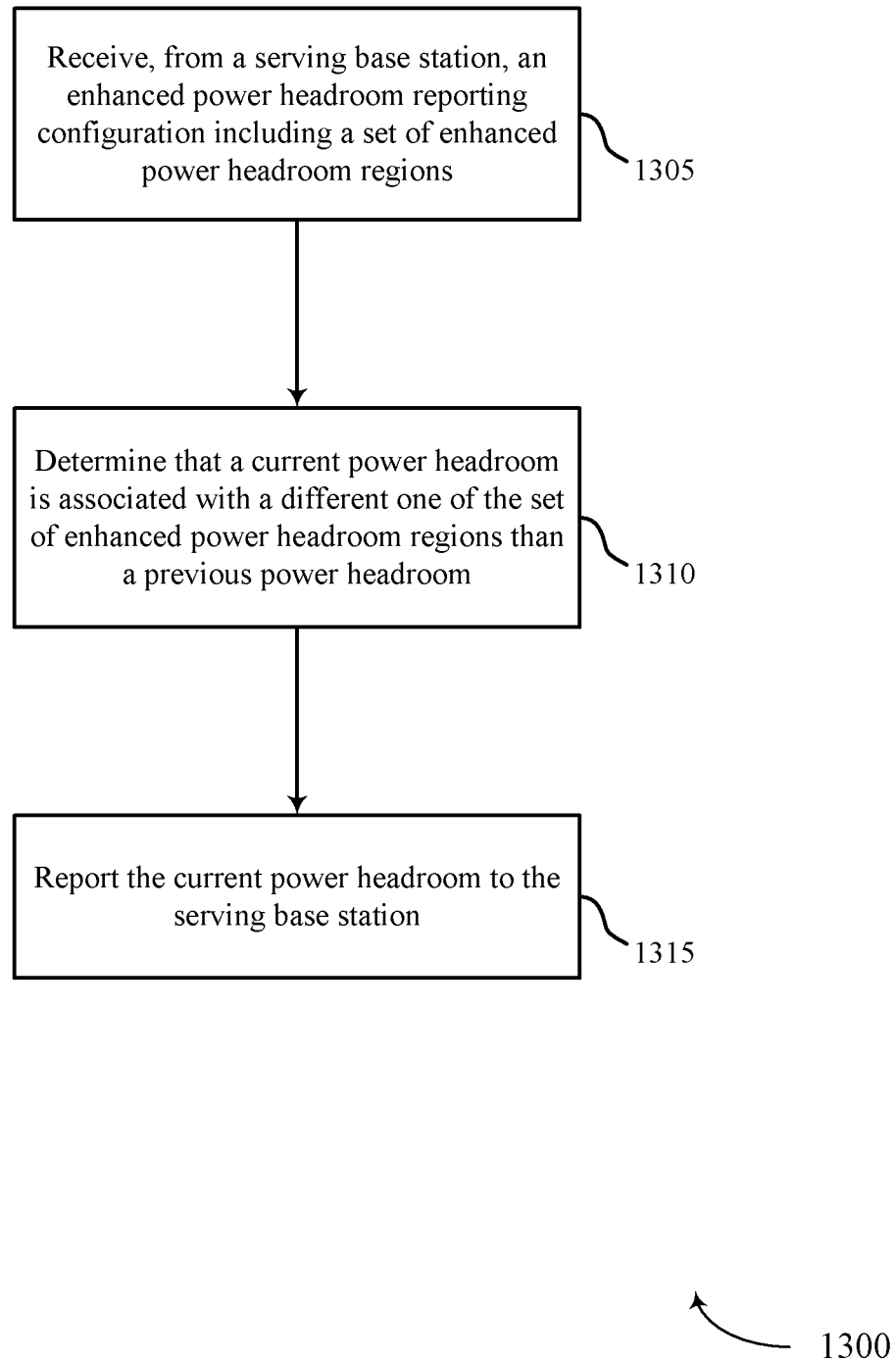
FIG. 13 shows a flowchart illustrating a method for enhanced power headroom reporting for low cost MTC devices in accordance with various aspects of the present disclosure.

FIG. 13 shows a flowchart illustrating a method 1300 for enhanced power headroom reporting for low cost MTC devices in accordance with various aspects of the present disclosure. The operations of method 1300 may be implemented by a UE 115 or its components as described with reference to FIGS. 1-9. For example, the operations of method 1300 may be performed by ePHR module 610 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may receive, from a serving base station, an enhanced power headroom reporting configuration comprising a plurality of enhanced power headroom regions as described with reference to FIGS. 2-5. In certain examples, the operations of block 1305 may be performed by the ePHR configuration module 710 as described with reference to FIG. 7.

At block 1310, the UE 115 may determine that a current power headroom is associated with a different one of the plurality of enhanced power headroom regions than a previous power headroom as described with reference to FIGS. 2-5. In certain examples, the operations of block 1310 may be performed by the ePHR monitoring module 715 as described with reference to FIG. 7.

At block 1315, the UE 115 may report the current power headroom to the serving base station as described with reference to FIGS. 2-5. In certain examples, the operations of block 1315 may be performed by the ePHR reporting module 720 as described with reference to FIG. 7.

Figure 14:
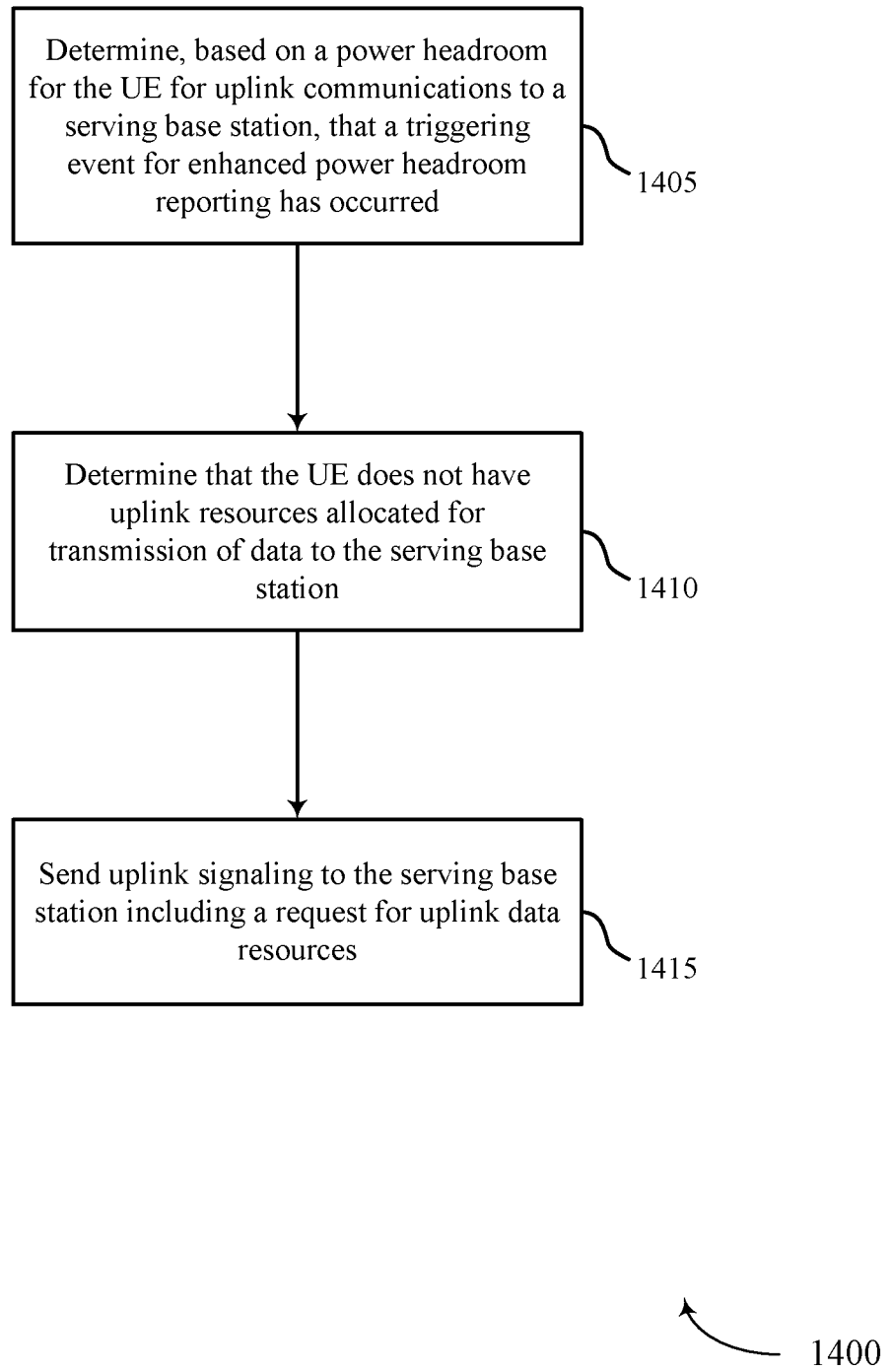
FIG. 14 shows a flowchart illustrating a method for enhanced power headroom reporting for low cost MTC in accordance with various aspects of the present disclosure.

FIG. 14 shows a flowchart illustrating a method 1400 for enhanced power headroom reporting for low cost MTC devices in accordance with various aspects of the present disclosure. The operations of method 1400 may be implemented by a UE 115 or its components as described with reference to FIGS. 1-9. For example, the operations of method 1400 may be performed by the ePHR module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may determine, based at least in part on a power headroom for the UE for uplink communications to a serving base station, that a triggering event for enhanced power headroom reporting has occurred as described with reference to FIGS. 2-5. In certain examples, the operations of block 1405 may be performed by the ePHR event trigger module 825 as described with reference to FIG. 8.

At block 1410, the UE 115 may determine that the UE does not have uplink resources allocated for transmission of data to the serving base station as described with reference to FIGS. 2-5. In certain examples, the operations of block 1410 may be performed by the uplink data processor 830 as described with reference to FIG. 8.

At block 1415, the UE 115 may send uplink signaling to the serving base station comprising a request for uplink data resources as described with reference to FIGS. 2-5. In certain examples, the operations of block 1415 may be performed by the uplink control signaling module 835 as described with reference to FIG. 8.

Thus, methods 1200, 1300, and 1400 may provide for power headroom reporting for low cost MTC devices. It should be noted that methods 1200, 1300, and 1400 describe possible implementation, and that the operations and the steps may be rearranged or otherwise modified such that other implementations are possible. In some examples, aspects from two or more of the methods 1200, 1300, and 1400 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a user equipment (UE), comprising:
    receiving, from a serving base station, an enhanced power headroom reporting configuration defining a plurality of enhanced power headroom regions for one or more coverage enhancement (CE) levels associated with a number of transmission repetitions;
    determining that a current power headroom is associated with a different one of the plurality of enhanced power headroom regions than a previous power headroom based at least in part on identifying a change in CE level for an uplink transmission; and
    reporting the current power headroom to the serving base station.

2. The method of claim 1, wherein the current power headroom comprises an enhanced power headroom determined based at least in part on one or more of a predetermined number of uplink resources, a target modulation and coding scheme, a target signal to noise ratio, or a current coverage enhancement configuration.

3. The method of claim 1, wherein the enhanced power headroom reporting configuration comprises a plurality of configuration groups, each of the plurality of configuration groups comprising one or more of the plurality of enhanced power headroom regions.

4. The method of claim 3, wherein the plurality of configuration groups comprises configuration groups with at least one of a different timer, a different enhanced power headroom reporting trigger threshold, a different reporting period, and an enable indicator for enhanced power headroom reporting.

5. The method of claim 3, further comprising:
    disabling an enhanced power headroom report for at least one of the plurality of configuration groups based at least in part on at least one of a plurality of enhanced power headroom reporting configurations.

6. The method of claim 1, wherein the enhanced power headroom reporting configuration disables a power headroom reporting trigger associated with a change in measured path loss for at least one of the plurality of enhanced power headroom regions.

7. The method of claim 1, further comprising:
    disabling a power headroom report within an enhanced power headroom region based at least in part on the enhanced power headroom reporting configuration.

8. A method of wireless communication at a user equipment (UE), comprising:
    determining, based at least in part on a power headroom for the UE using one or more coverage enhancement (CE) levels for uplink communications to a serving base station, that a triggering event for enhanced power headroom reporting has occurred based at least in part on identifying a change in CE level for an uplink transmission;
    determining that the UE does not have uplink resources allocated for transmission of data to the serving base station; and sending, based at least in part on the determining that the triggering event has occurred and the determining that the UE does not have uplink resources allocated for transmission of data, uplink signaling to the serving base station comprising a request for uplink data resources for a CE level from the one or more CE levels.

9. The method of claim 8, further comprising:
receiving an allocation of uplink resources for a data transmission to the serving base station; and
transmitting the data transmission to the serving base station using the allocation of uplink resources, wherein the data transmission comprises the power headroom.

10. The method of claim 9, wherein transmitting the data transmission further comprises transmitting an enhanced power headroom report using a media access control (MAC) layer control element.

11. The method of claim 9, further comprising:
resetting at least one timer associated with enhanced power headroom reporting based at least in part on transmitting the data transmission.

12. The method of claim 8, wherein the power headroom comprises an enhanced power headroom determined based at least in part on one or more of a predetermined number of uplink resources, a target modulation and coding scheme, a target signal to noise ratio, or a current coverage enhancement configuration.

13. The method of claim 8, wherein the triggering event occurs at a media access control (MAC) layer.

14. The method of claim 8, wherein the triggering event for enhanced power headroom reporting comprises a change in measured path loss, a configuration of a power headroom report, a reconfiguration of a power headroom report, a cell reconfiguration, an expiration of a timer, or a combination thereof.

15. An apparatus for wireless communication at a user equipment (UE), comprising:
a processor;
memory in electronic communication with the processor; and
instructions stored in the memory and operable, when executed by the processor, to cause the apparatus to:
receive, from a serving base station, an enhanced power headroom reporting configuration defining a plurality of enhanced power headroom regions for one or more coverage enhancement (CE) levels associated with a number of transmission repetitions;
determine that a current power headroom is associated with a different one of the plurality of enhanced power headroom regions than a previous power headroom based at least in part on identifying a change in CE level for an uplink transmission; and
report the current power headroom to the serving base station.

16. The apparatus of claim 15, wherein the current power headroom comprises an enhanced power headroom determined based at least in part on one or more of a predetermined number of uplink resources, a target modulation and coding scheme, a target signal to noise ratio, or a current coverage enhancement configuration.

17. The apparatus of claim 15, wherein the enhanced power headroom reporting configuration comprises a plurality of configuration groups, each of the plurality of configuration groups comprising one or more of the plurality of enhanced power headroom regions.

18. The apparatus of claim 17, wherein the plurality of configuration groups comprises configuration groups with at least one of a different timer, a different enhanced power headroom reporting trigger threshold, a different reporting period, and an enable indicator for enhanced power headroom reporting.

19. The apparatus of claim 17, wherein the instructions are further operable to cause the apparatus to:
disable an enhanced power headroom report for at least one of the plurality of configuration groups based at least in part on at least one of a plurality of enhanced power headroom reporting configurations.

20. The apparatus of claim 15, wherein the enhanced power headroom reporting configuration disables a power headroom reporting trigger associated with a change in measured path loss for at least one of the plurality of enhanced power headroom regions.

21. The apparatus of claim 15, wherein the instructions are further operable to cause the apparatus to:
disable a power headroom report within an enhanced power headroom region based at least in part on the enhanced power headroom reporting configuration.

22. An apparatus for wireless communication at a user equipment (UE), comprising:
a processor;
memory in electronic communication with the processor; and
instructions stored in the memory and operable, when executed by the processor, to cause the apparatus to:
determine, based at least in part on a power headroom for the UE using one or more coverage enhancement (CE) levels for uplink communications to a serving base station, that a triggering event for enhanced power headroom reporting has occurred based at least in part on identifying a change in CE level for an uplink transmission;
determine that the UE does not have uplink resources allocated for transmission of data to the serving base station; and
send, based at least in part on the determining that the triggering event has occurred and the determining that the UE does not have uplink resources allocated for transmission of data, uplink signaling to the serving base station comprising a request for uplink data resources for a CE level from the one or more CE levels.

23. The apparatus of claim 22, wherein the instructions are further operable to cause the apparatus to:
receive an allocation of uplink resources for a data transmission to the serving base station; and
transmit the data transmission to the serving base station using the allocation of uplink resources, wherein the data transmission comprises the power headroom.

24. The apparatus of claim 23, wherein transmitting the data transmission further comprises transmitting an enhanced power headroom report using a media access control (MAC) layer control element.

25. The apparatus of claim 23, wherein the instructions are further operable to cause the apparatus to:
reset at least one timer associated with enhanced power headroom reporting based at least in part on transmitting the data transmission.

26. The apparatus of claim 22, wherein the power headroom comprises an enhanced power headroom determined based at least in part on one or more of a predetermined number of uplink resources, a target modulation and coding scheme, a target signal to noise ratio, or a current coverage enhancement configuration.

27. The apparatus of claim 22, wherein the triggering event occurs at a media access control (MAC) layer.

28. The apparatus of claim 22, wherein the triggering event for enhanced power headroom reporting comprises a change in measured path loss, a configuration of a power headroom report, a reconfiguration of a power headroom report, a cell reconfiguration, an expiration of a timer, or a combination thereof.

* * * * *